(12) United States Patent
Stewart et al.

(10) Patent No.: US 7,481,656 B2
(45) Date of Patent: Jan. 27, 2009

(54) OPTICAL TRANSCEIVER PCB MOUNTING SYSTEM HAVING EMI CONTAINMENT FEATURES

(75) Inventors: James Stewart, Burlingame, CA (US); Chris Togami, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/674,585

(22) Filed: Feb. 13, 2007

(65) Prior Publication Data

US 2007/0207670 A1    Sep. 6, 2007

Related U.S. Application Data

(60) Provisional application No. 60/773,084, filed on Feb. 13, 2006.

(51) Int. Cl.
  *H01R 12/00*    (2006.01)
(52) U.S. Cl. ..................................... 439/76.1
(58) Field of Classification Search ................ 439/76.1, 439/95, 92; 361/752
  See application file for complete search history.

(56) References Cited

U.S. PATENT DOCUMENTS

| 4,506,939 | A | * | 3/1985 | Faulkenberry et al. ........ 439/63 |
| 4,661,888 | A | | 4/1987 | Jewell et al. |
| 5,335,147 | A | | 8/1994 | Weber |
| 5,430,618 | A | * | 7/1995 | Huang ........................ 361/818 |
| 5,920,459 | A | * | 7/1999 | Weber et al. ................ 361/752 |
| 6,222,739 | B1 | | 4/2001 | Bhakta et al. |
| 6,483,711 | B1 | * | 11/2002 | Huang ........................ 361/736 |
| 2005/0152701 | A1 | | 7/2005 | Liu et al. |

* cited by examiner

*Primary Examiner*—Phuong K Dinh
(74) *Attorney, Agent, or Firm*—Workman Nydegger

(57) ABSTRACT

A mounting system for securing a printed circuit board in a communication module, such as an optical transceiver module, is disclosed. In one embodiment, the transceiver module includes an outer shell and an enclosure that cooperate to contain the printed circuit board therein. The mounting system comprises first and second pins, wherein each pin includes a first end passing through respective holes coaxially defined in both the shell and the printed circuit board. The pins also each have a second end that includes a head. The head is positioned in a recess defined in an exterior portion of the shell such that the head does not interfere with insertion or removal of the transceiver module from a slot of a host device. Further, the second pin is electrically connected with both the outer shell and enclosure to prevent emissions of electromagnetic interference from the distal end of the transceiver.

21 Claims, 5 Drawing Sheets

OPTICAL TRANSCEIVER PCB MOUNTING SYSTEM HAVING EMI CONTAINMENT FEATURES

CROSS-REFERENCE TO RELATED APPLICATIONS

This application claims the benefit of U.S. Provisional Patent Application No. 60/773,084, filed Feb. 13, 2006, and entitled "OPTICAL TRANSCEIVER PCB MOUNTING SYSTEM HAVING EMI CONTAINMENT FEATURES," which is incorporated herein by reference in its entirety.

BACKGROUND

1. Technology Field

The present invention generally relates to communications modules, including optical transceiver modules. In particular, the present invention relates to a system for mounting a printed circuit board within a communications module, wherein the system is further configured to reduce the emission of electromagnetic interference from the module.

2. The Related Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interferences that would otherwise interfere with electrical signals. Light also provides a more secure signal because it doesn't allow portions of the signal to escape from the fiber optic cable as can occur with electrical signals in wire-based systems. Light also can be conducted over greater distances without the signal loss typically associated with electrical signals on copper wire.

While optical communications provide a number of advantages, the use of light as a transmission medium presents a number of implementation challenges. In particular, the data carried by a light signal must be converted to an electrical format when received by a device, such as a network switch. Conversely, when data is transmitted to the optical network, it must be converted from an electrical signal to a light signal. A number of protocols define the conversion of electrical signals to optical signals and transmission of those optical, including the ANSI Fibre Channel (FC) protocol. The FC protocol is typically implemented using a transceiver module at both ends of a fiber optic cable. Each transceiver module typically contains a laser transmitter circuit capable of converting electrical signals to optical signals, and an optical receiver capable of converting received optical signals back into electrical signals.

Typically, a transceiver module is electrically interfaced with a host device—such as a host computer, switching hub, network router, switch box, computer I/O and the like—via a compatible connection port. Moreover, in some applications it is desirable to miniaturize the physical size of the transceiver module to increase the port density, and therefore accommodate a higher number of network connections within a given physical space. In addition, in many applications, it is desirable for the module to be hot-pluggable, which permits the module to be inserted and removed from the host system without removing electrical power.

To accomplish many of these objectives, international and industry standards have been adopted that define the physical size and shape of optical transceiver modules to insure compatibility between different manufacturers. For example, in 2000, a group of optical manufacturers developed a set of standards for optical transceiver modules called the Small Form-factor Pluggable ("SFP") Transceiver Multi-Source Agreement ("MSA"), incorporated herein by reference. In addition to the details of the electrical interface, this standard defines the physical size and shape for the SFP transceiver modules, and the corresponding host port, so as to insure interoperability between different manufacturers' products. There have been several subsequent standards, and proposals for new standards, including the XFP MSA for 10 Gigabit per second modules using a serial electrical interface, that also define the form factors and connection standards for pluggable optoelectronic modules, such as the published draft version 0.92 (XFP MSA), incorporated herein by reference.

Regardless of the particular form factor employed, it is of common concern in the design of the various transceiver modules to maximize the usable surface area of a printed circuit board ("PCB") included within each module. The need for maximization of usable PCB surface has become more pronounced as the data rates at which current transceivers operate steadily rise.

In known designs, the PCB is typically secured within the transceiver module by a screw that extends through the PCB and is received within a correspondingly-sized recess defined in an interior of the transceiver shell. While satisfactory, this design undesirably requires a relatively large amount of PCB surface to be occupied, thereby making it unavailable for the placement of electronic components, pads, or traces critical for transceiver functionality.

As optical transmission and reception data rates rise, additional problems arise. For example, electronic devices and components operating at high frequencies typically emit signals referred to as electromagnetic interference. This electromagnetic interference, referred to as "EMI," is electrical noise in the form of an electromagnetic wave. The phenomenon is undesirable because EMI can interfere with the proper operation of other electrical components. Optical transceiver packages, especially those operating at high transmission speeds, are especially susceptible to emitting EMI. In particular, the physical configuration of existing transceiver modules does a poor job of containing EMI—especially as the generating speed of the module increases.

Therefore, there is a need in the industry for a pluggable communications module, such as an optical transceiver module, that is configured so as to maximize usable PCB surface area while minimizing the emission of EMI. Preferably, the module configuration could be used in environments having high frequency data signal transmissions. Moreover, the module configuration should not affect the data signal integrity or the speed capabilities of the module. In addition, the electronic module should be implemented in a manner that meets existing standard form factors.

BRIEF SUMMARY

The present invention has been developed in response to the above and other needs in the art. Briefly summarized, embodiments of the present invention are directed to a mounting system for securing a printed circuit board in a communication module, such as an optical transceiver module.

In one embodiment, the transceiver module includes an outer shell and an enclosure that cooperate to contain the printed circuit board therein. The mounting system comprises first and second pins, wherein each pin includes a shaft having a first end passing through respective holes coaxially defined in both the shell and the printed circuit board. Each of the pins also has a second end that includes a head. The head is positioned in a recess defined in an exterior portion of the shell such that the head does not interfere with insertion or removal of the transceiver module from a slot of a host device. Further, the second pin is electrically connected with both the outer shell and enclosure to prevent emissions of electromagnetic interference from the distal end of the transceiver.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-8 depict various features of embodiments of the present invention, which is generally directed to an optoelectronic device, such as an optical transceiver module, having a printed circuit board, and a mounting system for securing the printed circuit board within the transceiver module. The mounting system minimizes the amount of surface area it occupies on the printed circuit board, thereby preserving relatively more space for critical component placement on the board surface. In addition, the mounting system desirably controls the emission of electromagnetic interference from the transceiver module, thereby reducing signal interference during transceiver operation.

Note that the embodiments to be described herein focus on implementation of the present invention in an optical transceiver module. However, the invention should not be so limited, but is understood to extend to other optoelectronic devices, such as optical transmitters and receivers, where improved printed circuit board mounting schemes and electromagnetic interference containment are desired. The optical transceiver module to be described below includes various components to enable the reception and transmission of optical signals to and from a host system that is operably connected to the transceiver. The host system can be included as a node in an optical communications network, for instance, and can employ the transceiver in communicating via optical signals with other components of the network.

1. Exemplary Operating Environment

Figure 1:
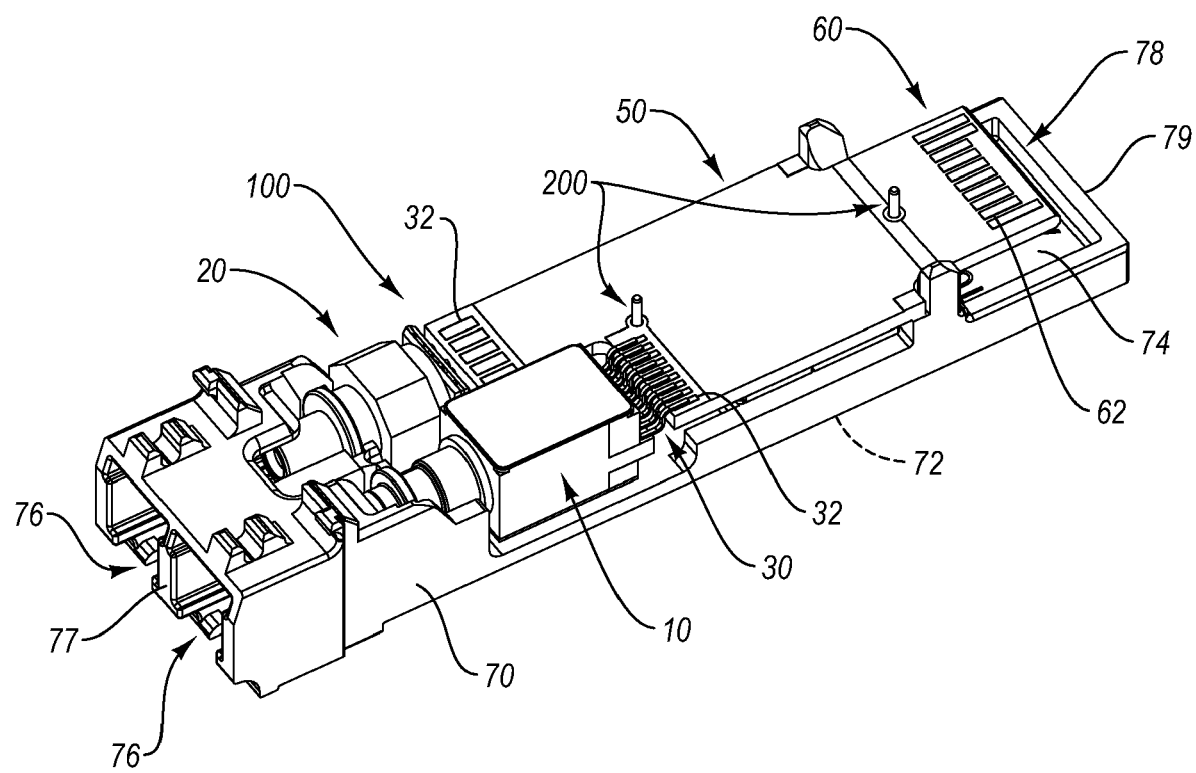
FIG. 1 is a perspective view of an interior portion of an optical transceiver module having a PCB mounting system in accordance with one embodiment of the present invention.

Reference is first made to FIG. 1, which depicts a perspective view of an optical transceiver module ("transceiver"), generally designated at 100, for use in transmitting and receiving optical signals in connection with an external host that is operatively connected in one embodiment to a communications network (not shown). As depicted, the transceiver shown in FIG. 1 includes various components, including a transmitter optical subassembly ("TOSA") 10, a receiver optical subassembly ("ROSA") 20, electrical interfaces 30, and a an electronic component platform such as a printed circuit board ("PCB") 50. In detail, two electrical interfaces 30 are included in the transceiver 100, one each used to electrically connect the TOSA 10 and the ROSA 20 to a plurality of conductive pads 32 located on the PCB 50. Though not shown, various electronic components are also operably attached to the PCB 50.

An edge connector 60 including a plurality of conductive pads 62 is located on an end of the PCB 50 to enable the transceiver 100 to electrically interface with a host (not shown here). As such, the PCB 50 facilitates electrical communication between the TOSA 10/ROSA 20, and the host. In addition, the above-mentioned components of the transceiver 100 are partially housed within a shell 70. The shell 70 cooperates with an enclosure, shown at 80 in FIG. 4, to define a housing for the components of the transceiver 100. In the present embodiment, both the shell 70 and enclosure 80 are composed of a conductive material, such as metal.

Figure 2:
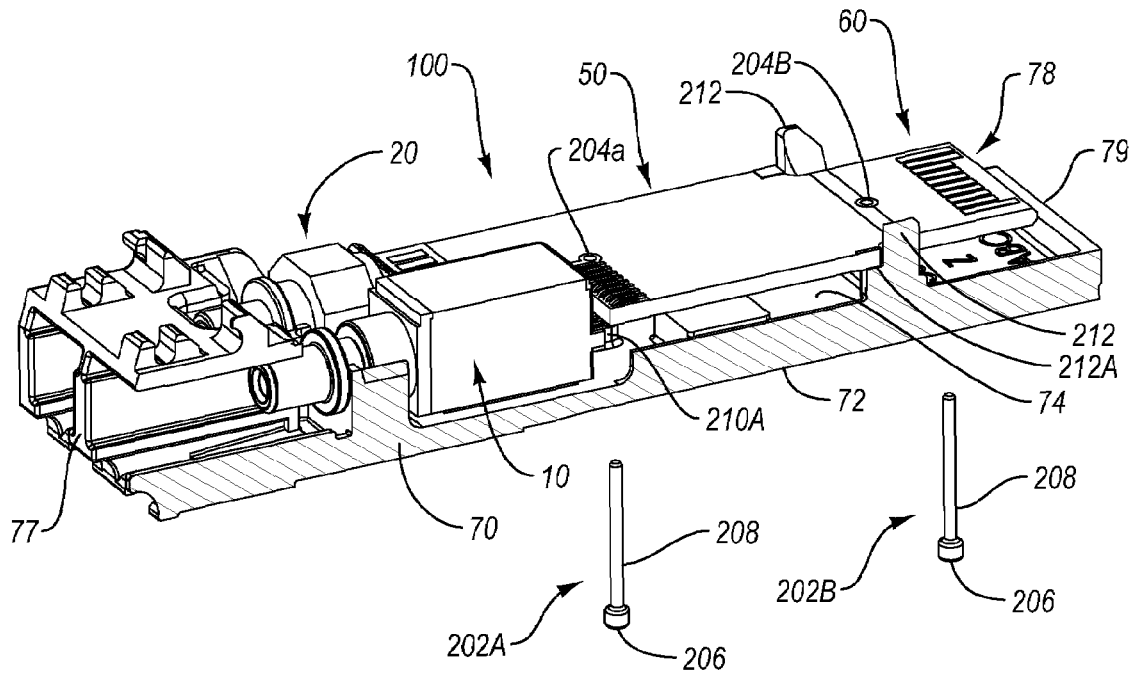
FIG. 2 is a partially exploded view of the optical transceiver module of FIG. 2, showing various elements of the PCB mounting system.
Figure 3:
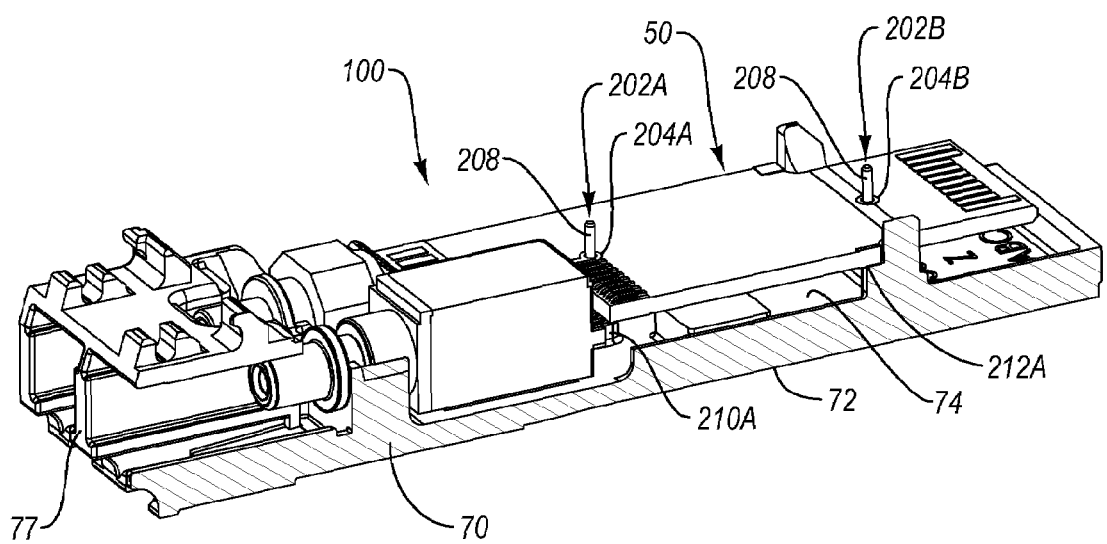
FIG. 3 is a perspective view of the PCB mounting system in its assembled state.

The shell 70 is shown in FIGS. 1-3 in an inverted configuration, and as such a top outer surface 72 of the shell is shown facing downward. The shell 70 further includes a top inner surface 74, and front openings 76 included on a proximal end 77 of the transceiver 100. Also, a rear opening 78 is defined by the shell 70 and enclosure 80 at a distal end 79 of the transceiver 100 through which extends the edge connector 60. As will be seen, the rear opening 78 has traditionally been a source for the emission of problematic electromagnetic interference ("EMI"), especially with higher data rate transceivers. As such, embodiments of the present invention are configured to alleviate this problem.

While it has been described in some detail here, the optical transceiver 100 is described by way of illustration only, and not by way of restricting the scope of the invention. For example, the optical transceiver 100 can be configured in one embodiment to be suitable for optical signal transmission and reception at one of a variety of per-second data rates, including but not limited to 1 Gbit, 2 Gbit, 4 Gbit, 8 Gbit, 10 Gbit, or higher bandwidth fiber optic links. Furthermore, the principles of the present invention can be implemented in optical transceivers of any form factor such as XFP, SFP and SFF, without restriction. Nevertheless, the transceiver 100 shown in the accompanying figures has an SFP form factor and a data rate of 2.5 Gbit/sec for use in DWDM applications, for example.

Briefly, during operation the optical transceiver 100 receives a data-containing optical signal from a fiber via the ROSA 20. The ROSA 20 acts as an opto-electric transducer by transforming the received optical signal into an electrical signal. The ROSA 20 provides the resulting electrical signal to a post-amplifier (not shown), where the signal is conditioned before being forwarded to the host device. Similarly, a data-containing electrical signal can be sent by the host device to the transceiver 100 for transmission to the communications network. The electrical signal is conditioned by a laser driver before being forwarded to the TOSA 10, where the electrical signal is converted to an optical signal and launched on to an optical fiber operably connected to the TOSA. As such, the TOSA 10 operates as an electro-optic transducer.

2. PCB Mounting Structure

Figure 5:
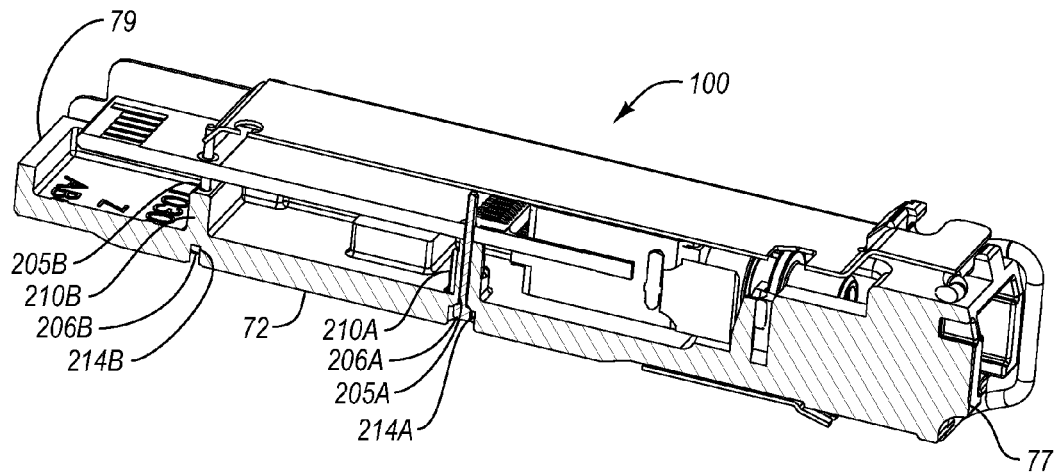
FIG. 5 is a perspective cross sectional view of the assembled optical transceiver module in accordance with one embodiment.

Together with FIG. 1, reference is now also made to FIGS. 2, 3, and 5 in describing various details regarding the present invention, according to one exemplary embodiment. As shown, the transceiver 100 includes a PCB mounting system, generally designated at 200, which is employed to securely fasten the PCB 50 within the cavity partially defined by the shell 70 of the transceiver 100. As has been alluded to earlier, the mounting system 200 not only secures the PCB in the transceiver 100, but also controls the emission of EMI from the transceiver. Various details regarding these features of the present invention are given below.

In accordance with the present embodiment, the mounting system 200 generally includes mounting pins 202A and 202B, which correspond to and interact with PCB holes 204A and 204B defined in the PCB 50. FIG. 2 shows that each pin 202 includes a shaft 208 defining a first end of the pin, and a head 206 disposed at a second end thereof. The length of each pin shaft 208 is sufficient to be able to extend into interior portion of the transceiver 100 and through the PCB 50 when the PCB is positioned in the transceiver. In one embodiment each pin 202A, B has a length of approximately 8 mm and a shaft diameter of approximately 0.5 mm. The head 206 has a diameter of approximately 1 mm. Of course, the pin dimensions can be modified from what is disclosed here, according to transceiver design.

The PCB holes 204A and 204 B are each sized so as to suitably allow the respective pin 202 A or B to pass therethrough when assembled. Each PCB hole 204A, B is coaxially aligned with corresponding holes 205A and 205B (FIG. 5) defined through the top surface 72 of the shell 70. In greater detail, the hole 205A is defined through a platform 210A defined on the shell top inner surface 72, best shown in FIG. 5. The hole 205A coaxially aligns with the PCB hole 204A so as to allow the pin 202A to pass through the shell 70 and PCB 50 in order to secure the PCB. The platform 210A is sized and configured to support the PCB 50 at a desired level above the shell top inner surface 72 so as to enable the PCB to electrically connect with the TOSA 10, ROSA 20, and the host device. In another embodiment, the hole defined through the shell is not defined through the platform, but rather is separate therefrom.

In the case of the rear pin 202B, the hole 205B is also defined through the shell 70 to be coaxial with the PCB hole 204B so as to allow the rear pin to pass through the shell and PCB 50. A shell platform 210B is used to support the PCB 50 at this location and the platform 210B is penetrated by the shell hole 205B. Also, two posts 212 defined on the shell include cutouts 212A to further support the PCB 50 at the proper level.

FIGS. 3 and 5 show the front pin 202A and rear pin 202B in their seated positions in the transceiver 100. In such seated positions, the head 206 of each pin 202A and B abuts against a surface of the shell top outer surface 72 to provide a stop point for the pin when the pin is properly positioned for securing the PCB 50. In the illustrated embodiment each pin head 206 when properly seated resides in a respective recess 214A or 214B defined in the shell 70. As shown, each recess 214A, B is coaxially aligned and in communication with one of the holes 205A, B defined in the shell 70. In other embodiments, the recess need not be coaxial with the holes defined in the shell, but rather can merely be in communication with the holes.

As best shown in FIGS. 3 and 5, each pin 202A and B when seated in the transceiver 100 is positioned such that a portion of the shaft 208 extends above the visible surface of the PCB 50. The distance the rear pin 202B extend above the PCB 50 is sufficient such that, when the enclosure 80 (FIG. 4) is placed on the shell 70, the first end of the rear pin contacts an adjacent portion of the enclosure, as seen in FIG. 5. This is helpful in controlling EMI emissions, as will be discussed further below. In other embodiments, the pins can be sized such that they do not touch the enclosure inner surface when assembled or such that they terminate flush with the PCB surface, if desired.

As mentioned, the PCB 50 rests upon the shell platform 210A and the cutouts 212A of each post 212 so as to be positioned at the proper height within the transceiver 100. Further, the mounting system 200, including the pins 202A, B and PCB holes 204A, B is configured to secure the PCB 50 in its proper position. This can be accomplished after assembly of the various transceiver components, including the mounting system 200, as shown in FIG. 3. Solder, or other suitable substance or implementation for affixing each pin 202 to the PCB 50, is used to bond each pin to the PCB. The solder can be placed at the point where each pin shaft 208 passes through the respective PCB hole 204A, B on either or both surfaces of the PCB so as to prevent movement of the PCB as seated on the platform 210A and cutouts 212A.

Additionally, solder can be placed near the head 206 of each pin 202A, B at the point of passage of each pin 202A, B through the shell top outer surface 72 to bond the head to the shell 70. Alternatively, another suitable adhesive can be employed to bond the pin heads 206 to the shell 70. Note that, when assembled with the transceiver and properly seated, the heads 206 of the pins 202A, B seat within the recesses 214A, B respectively. The recesses enable the pin heads 206 themselves to be recessed below the top shell surface 72 so as not to interfere with insertion or removal of the transceiver 100 into or from the host device.

The amount of solder placed at the pin shaft-PCB hole interface, and thus the size of the respective solder fillet formed, can be controlled by using an appropriately sized solder mask. So sized, the solder fillet will occupy a minimum of space of the PCB surface. This, combined with the reduced size of the pin shaft and PCB hole when compared to traditional screw-hole combinations for securing the PCB, results in a net increase of usable board surface for the placement of traces, pads, components, etc. Thus, the present design represents a significant increase in usable PCB area, or "real estate," over that available in known designs, while still acceptably securing the PCB 50 within the shell 70. Note that a net increase in usable PCB surface area is present on both surfaces of the PCB, owing to the fact that components, traces, etc. can be disposed on either side of the PCB surface. For instance, the PCB holes in the present embodiment have a diameter of approximately, 0.75 mm. The PCB holes in known optical transceiver systems, by comparison can be approximately 1.7 mm in diameter. As such, it is seen that a non-insignificant amount of PCB space is preserved for use by practice of embodiments of the present invention.

Figure 4:
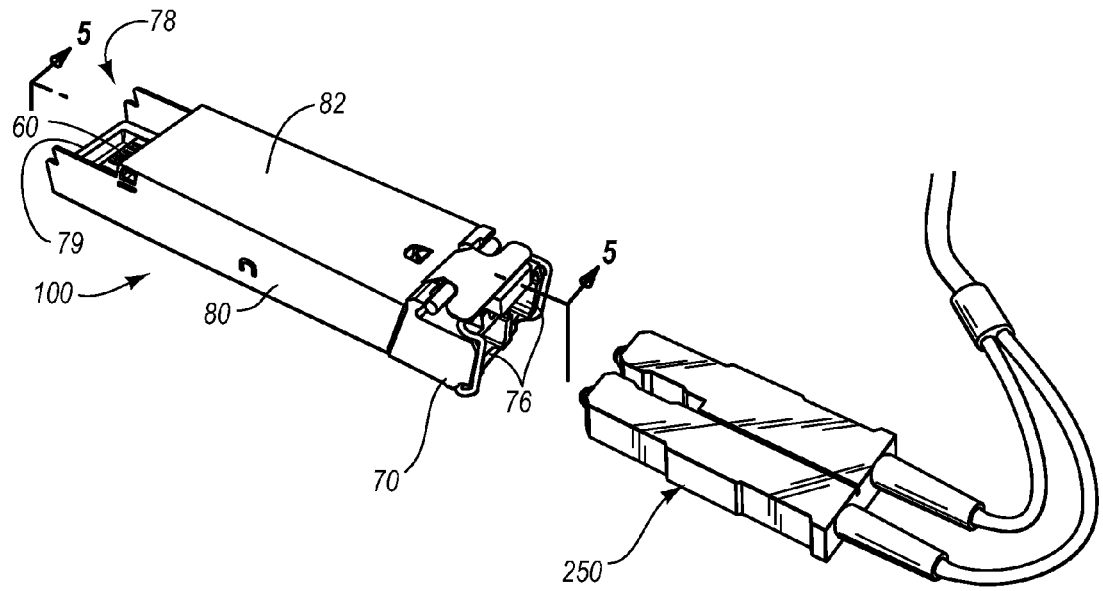
FIG. 4 is a perspective view of the assembled optical transceiver module and an optical connector configured for mating with the transceiver module.
Figure 6:
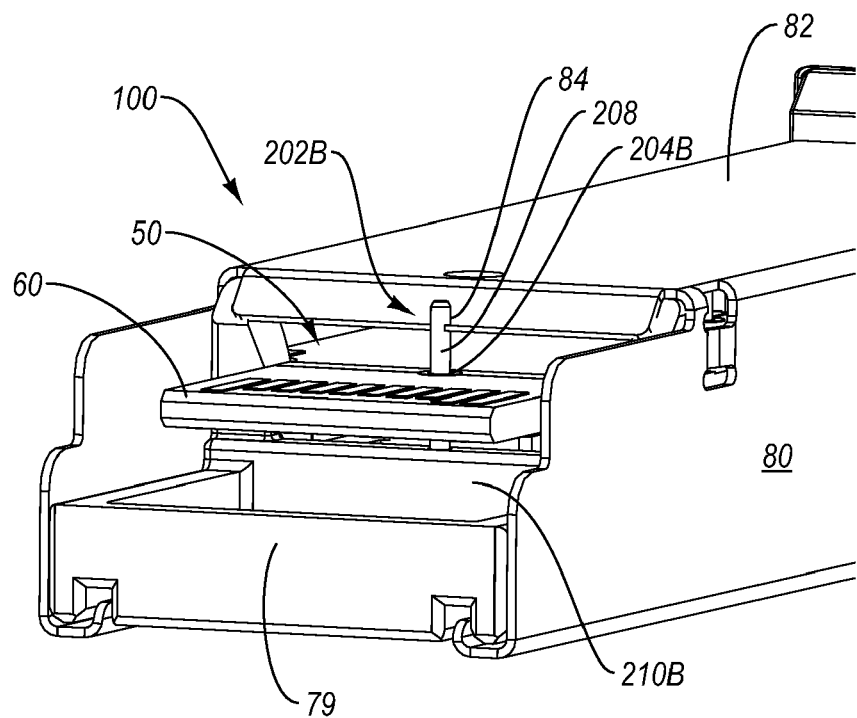
FIG. 6 is a perspective view of a distal end of an optical transceiver module including a PCB mounting system according to one embodiment.
Figure 7:
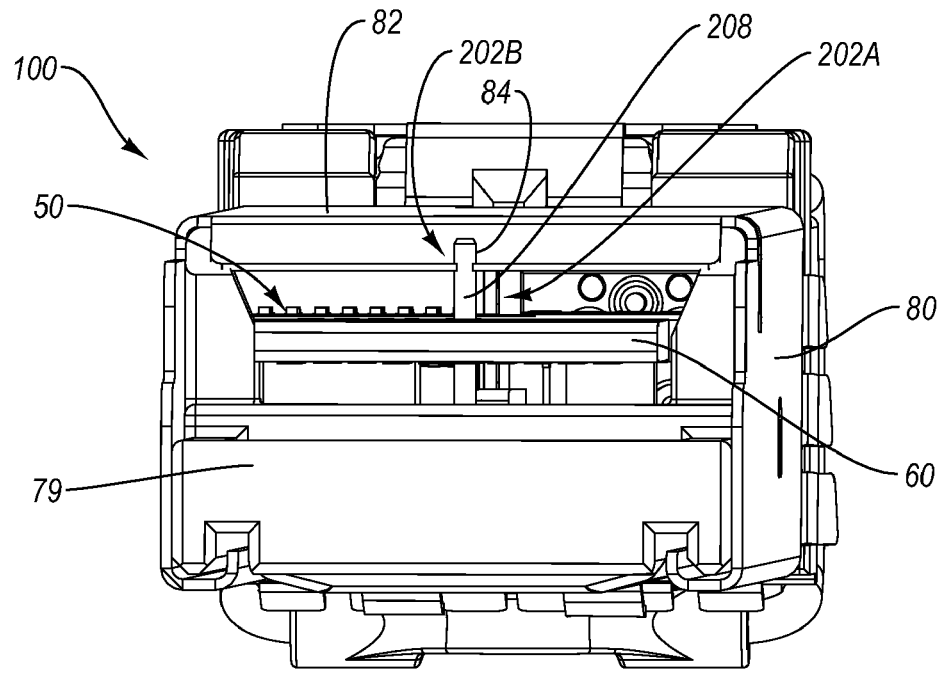
FIG. 7 is an end view of the optical transceiver module of FIG. 6.

Together with FIGS. 1-3 and 5, reference is now made to FIGS. 4, 6, and 7. The rear pin 202B serves an additional function in the transceiver 100, in that it is configured in one embodiment to curb EMI emissions from the transceiver 100. As is well known, EMI is produced by various transceiver components during transceiver operation. Should such EMI escape the confines of the transceiver 100, it can adversely affect other electronic components positioned nearby. Moreover, EMI becomes more problematic as the power and data rate of transceivers steadily rise, given that higher frequency signals used in high data rate applications have relatively smaller signal wavelengths, which in turn allows such wavelengths to more easily escape from relatively large openings in the transceiver enclosure. As such, reduction of overall EMI emissions is particularly beneficial.

In particular, note the pins 202A and B are composed in the present embodiment of an electrically conductive material, such as metal, so as to assist in EMI emission control. Further note that the enclosure sliding engages the shell 70, thereby physically and electrically interconnected the two components with one another when assembled as shown in FIG. 4. Moreover, the shell 70 and enclosure 80 are grounded such that they form a "chassis ground" with respect to the remainder of the transceiver 100.

The above chassis ground electrically connects with a chassis ground of the host system when the transceiver is received into the host system. Placement of the rear pin 202B as shown in FIG. 3 and mating of the enclosure 80 with the shell 70, as seen in FIG. 4, enables a conductive path to be established between the shell and enclosure near the rear opening 78, via the rear pin. In particular, the head 206 and portions of the shaft 208 of the conductive rear mounting pin 202B contact the shell 70 so as to be electrically connected therewith. The shaft 208 of the rear mounting pin 202B near the first end thereof contacts and electrically connects with a notch 84 defined in the enclosure 80, as seen in FIGS. 6 and 7.

This grounded conductive path provided by the rear mounting pin 202B is in addition to other conductive paths that are typically established between the shell 70 and enclosure 80 near the rear opening 78, including the posts 212 of the shell, which physically contact the enclosure. The grounded conductive path defined by the rear pin 202B as described above, however, is placed midway between the grounded posts 212, as best seen in FIG. 6. As such, the rear pin 202B forms part of a "jail bar" or "Faraday cage" near the rear opening 78 of the transceiver 100, which inhibits the ability of EMI to escape the rear opening, thereby protecting proximate devices from EMI contamination. Particularly, as the size of the openings in the Faraday cage are made smaller, the wavelength of the EMI that is able to escape through the Faraday cage must be proportionally smaller. By reducing the rear opening dimension by half, the amount of EMI having a given wavelength that can escape through the Faraday cage is also cut in half Note that the chassis ground described above is distinct from a signal ground that is maintained with respect to the PCB, in the present embodiment. This separation is maintained so as to prevent electro-static discharge events from damaging sensitive electronic components on the PCB.

Thus, in addition to physically securing the PCB 50, the rear mounting pin 202B acts as an EMI blocker for reducing the effective size of the rear opening of distal end 79 of the transceiver 100, thereby preventing or reducing EMI emission from this largest opening in the transceiver 78, while still allowing high speed signals transmitted via traces on the PCB to pass therethrough. Additionally, in an alternative embodiment the front and/or rear mounting pin can also conductively connect with a ground trace on the PCB itself, thereby electrically interlinking the PCB, the shell, and the enclosure. Also, the front mounting pin 202A can be made in one embodiment to physically contact the enclosure 80, like the rear mounting pin 202B, if desired.

Note that this EMI blocking function of the rear mounting pin 202B can be achieved without the degradation of electronic performance of the components or traces of the PCB 50, assuming a suitable PCB board design is used. FIG. 4 further shows the optical connector 250 coupled to optical fibers, which connector allows optical signals to pass to and from the transceiver 100.

The mounting system 200 is further configured to be removable so as to enable changeout of the PCB 50 or other transceiver components when needed. As such, removal of the solder bond and pins 202A, B from the transceiver frees the PCB, thereby allowing for its removal.

In another example embodiment, two PCBs can be included within the transceiver is a sandwich configuration, though in exemplary embodiments use of the present mounting system desirably enables PCB count to be reduced from two to one due to the increased usable area on the PCB possible with the present mounting system. In the case where multiple PCBs are used, however, the mounting system can be used to support and secure both PCBs by including aligned PCB holes in either board, and by passing the pins through each board and the shell. In yet another embodiment, the pins can pass through and attach to the enclosure instead of the shell, if desired.

Figure 8:
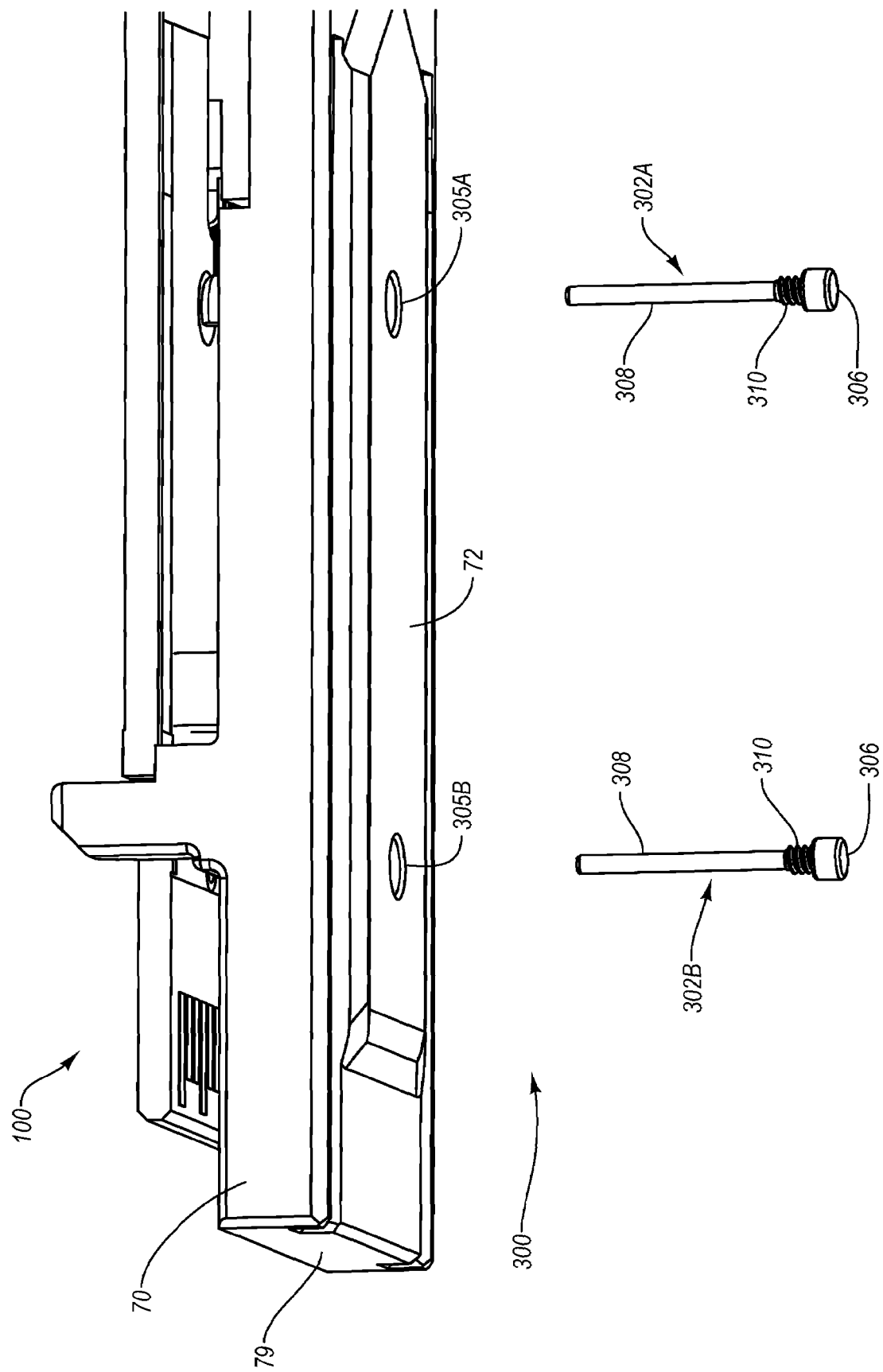
FIG. 8 is a perspective view of a portion of an optical transceiver module including a PCB mounting system, in accordance with yet another embodiment of the present invention.

Reference is now made to FIG. 8 is describing yet another embodiment of the present invention, wherein the transceiver 100 is shown having a PCB mounting system 300. The mounting system 300 includes mounting pins 302A and 302B. Each mounting pin 302A, B includes a head 306 and a shaft 308. Each shaft 308 includes a threaded portion 310 that engages with complementary threads defined in a corresponding portion of each shell hole 305A, 305B. Once threadably engaged with the shell 70, each mounting pin 302A, B can be soldered to the shell, if desired. So configured, each mounting pin 302A, B z is secured to the shell 70 of the transceiver 100 and positioned so as to support the PCB (not shown here) in the manner described in earlier embodiments.

Yet other modifications to the PCB mounting system described above are possible. For instance, the mounting pins can be placed in positions different from that shown in the figures or can include more than two pins to support the PCB, if desired. Also, the head of one or both mounting pins can include surface features to facilitate head removal or placement with respect to the transceiver. Such surface features could include recesses, protrusions, etc.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A communications module comprising:
   an outer shell;
   a printed circuit board;
   at least first and second pins, each pin including:
      a shaft including a first end that passes through respective holes defined in both the shell and the printed circuit board, a portion of the shaft being affixed to the printed circuit board by solder to secure the printed circuit board in a predetermined position;
      a second end including a head, the head being positioned in a respective recess defined in an exterior portion of the shell and affixed to the shell by solder or adhesive.

2. The communications module as defined in claim 1, wherein the head of each pin is positioned adjacent the respective hole defined in the shell, the head being larger than the hole so as to limit insertion of the pin into the shell.

3. The communications module as defined in claim 1, wherein an adhesive is employed between the head of each pin and the shell.

4. The communications module as defined in claim 1, wherein the holes defined in the shell are coaxially aligned with the holes defined in the printed circuit board.

5. The communications module as defined in claim 1, wherein the printed circuit board is supported by at least one grounding platform defined by the shell.

6. The communications module as defined in claim 1, wherein the at least one structure defined by the shell for supporting the printed circuit board includes a platform, the platform having one of the holes defined by the shell extending therethrough.

7. An optical transceiver module, comprising:
   a housing containing a printed circuit board, the housing including first and second holes therein that are axially aligned with first and second holes defined in the printed circuit board, the housing farther defining supporting structures that support the printed circuit board in a predetermined position, wherein the housing is defined by a shell and an enclosure that is slidingly engaged with the shell;
   a proximal first mounting pin extending through the first holes of the housing and the printed circuit board; and
   a distal second mounting pin extending through the second holes of the housing and the printed circuit board, wherein the first and second mounting pins are fixedly attached to the printed circuit board to secure the printed circuit board in the predetermined position and so as to not impede placement of conductive features on the printed circuit board, and wherein at least one of the first and second mounting pins is electrically connected with the housing, and wherein the distal second mounting pin is located within an opening of the housing to partially block the opening of the housing.

8. The optical transceiver module as defined in claim 7, wherein the first and second holes of the housing are defined in the shell.

9. The optical transceiver module as defined in claim 7, wherein the second mounting pin is positioned proximate an edge connector extending from the opening at a distal end of the housing, the second mounting pin being electrically connected with both the shell and the enclosure so as to control emission of electromagnetic interference from the distal end of the housing.

10. The optical transceiver module as defined in claim 7, wherein each mounting pin includes a head that is received in a recess defined by an outer portion of the shell.

11. The optical transceiver module as defined in claim 10, wherein each head is received in the respective recess such that insertion and removal of the optical transceiver module into and from a host device is not impeded.

12. The optical transceiver module as defined in claim 7, wherein the supporting structures of the housing further include two posts having cutout portions, the posts being defined by a shell of the optical transceiver module.

13. The optical transceiver module as defined in claim 7, wherein the distal second mounting pin is located approximately midway between grounding posts of the housing that support the printed circuit board proximate to edges of the opening.

14. The optical transceiver module as defined in claim 13, wherein the location of the distal mounting pin creates a Faraday cage.

15. The optical transceiver module as defined in claim 13, wherein the mounting pin substantially reduces the size of the opening in half.

16. The optical transceiver module as defined in claim 7, wherein both the first and second mounting pins are disposed approximately midway between opposing sides of the housing.

17. The optical transceiver module as defined in claim 7, wherein a shaft diameter of the first and second mounting pins are approximately a half a millimeter.

18. The optical transceiver module as defined in claim 7, wherein the housing includes a notch in the housing, wherein an end of the distal second mounting pin electrically connects to the notch.

19. The optical transceiver module as defined in claim 7, wherein the shafts of the mounting pins include threads disposed near heads disposed at an end of the mounting pins, wherein the threads of the mounting pins engage with complementary threads defined in the first and second holes of the housing.

20. The optical transceiver module as defined in claim 7, wherein a ground established between the mounting pins, housing, and printed circuit board is distinct from a signal ground that is maintained with respect to the printed circuit board so as to prevent electro-static discharge events from damaging electronic components on the printed circuit board.

21. An optical transceiver module, comprising:
   a housing containing a printed circuit board, the housing including first and second holes therein that are axially aligned with first and second holes defined in the printed circuit board, the housing farther defining supporting structures that support the printed circuit board in a predetermined position;
   a proximal first mounting pin extending through the first holes of the housing and the printed circuit board; and
   a distal second mounting pin extending through the second holes of the housing and the printed circuit board, wherein the first and second mounting pins are fixedly attached to the printed circuit board to secure the printed circuit board in the predetermined position and so as to not impede placement of conductive features on the printed circuit board, and wherein at least one of the first and second mounting pins is electrically connected with the housing, and wherein the distal second mounting pin is located within an opening of the housing to partially block the opening of the housing, wherein the first and second mounting pins electrically connect to a midsection of the printed circuit board, and the printed circuit board is supported at a periphery of the printed circuit board by grounding supports of the housing which also electrically connect to the printed circuit board.

* * * * *

UNITED STATES PATENT AND TRADEMARK OFFICE
CERTIFICATE OF CORRECTION

PATENT NO. : 7,481,656 B2  Page 1 of 1
APPLICATION NO. : 11/674585
DATED : January 27, 2009
INVENTOR(S) : Stewart et al.

It is certified that error appears in the above-identified patent and that said Letters Patent is hereby corrected as shown below:

Column 3
Line 27, change "FIG. 2" to --FIG. 1--

Column 4
Line 26, remove [a] after "and"
Line 50, add --(FIG. 4)-- after "80"

Column 5
Line 37, add --.-- after "thereof"
Line 46, change "204 B" to --204B--
Line 53, change "72" to --74--
Line 58, change "72" to --74--

Column 6
Line 14, change "recess" to --recesses--
Line 33, add --,-- after "B"

Column 7
Line 27, change "interconnected" to --interconnecting--
Line 62, add --.-- after "half"
Line 44, change "in the" to --in a bottom portion 82 of the--

Column 8
Line 48, remove [z]

Signed and Sealed this

Third Day of August, 2010

David J. Kappos
*Director of the United States Patent and Trademark Office*